(12) United States Patent
Steiner et al.

(10) Patent No.: US 6,296,326 B1
(45) Date of Patent: Oct. 2, 2001

(54) METHOD FOR DETERMINING A TRIGGERING THRESHOLD VALUE FOR AN AUTOMATIC BRAKING OPERATION

(75) Inventors: Manfred Steiner, Winnenden; Bernd Knoff, Esslingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/170,198

(22) Filed: Oct. 13, 1998

(30) Foreign Application Priority Data

Oct. 13, 1997 (DE) .............................. 197 45 128

(51) Int. Cl.$^7$ .............................. B60K 41/20; B60T 7/04; B60T 7/12; B60T 13/66
(52) U.S. Cl. .............................. 303/125; 303/3; 303/155; 303/191
(58) Field of Search .............................. 303/191, 125, 303/135, 2–3, 113.2, 113.3, 155, 113.4, 114.3, 15, 16–18, 193; 180/271, 179, 175, 278, 275, 169; 188/356, DIG. 1; 192/221, 12 R, 13 R; 477/182; 701/70, 78

(56) References Cited

U.S. PATENT DOCUMENTS

| 4,146,108 | * | 3/1979 | Sato . | |
|---|---|---|---|---|
| 4,541,052 | * | 9/1985 | McCulloch . | |
| 5,535,123 | | 7/1996 | Rump et al. | 364/426.02 |
| 5,669,676 | | 9/1997 | Rump et al. | 303/125 |
| 5,835,008 | * | 11/1998 | Colemere, Jr. | 701/70 |
| 5,921,641 | * | 7/1999 | Lupges et al. | 303/191 |
| 5,924,508 | * | 7/1999 | Clauss et al. | 303/125 |

FOREIGN PATENT DOCUMENTS

| 44 13 172 | | 3/1995 | (DE) . |
|---|---|---|---|
| 44 22 664 | | 3/1995 | (DE) . |
| 0 819 591 | | 1/1998 | (EP) . |
| 2288446 | * | 10/1995 | (GB) . |
| 2330185 | * | 4/1999 | (GB) . |
| 4-118344 | | 4/1992 | (JP) . |
| 4-42466 | | 4/1992 | (JP) . |
| 8-40229 | | 2/1996 | (JP) . |
| 8-80822 | | 3/1996 | (JP) . |
| 10-157585 | * | 6/1998 | (JP) . |
| 11-286264 | * | 10/1999 | (JP) . |
| WO 95/01898 | | 1/1995 | (WO) . |
| 9728030 | * | 8/1997 | (WO) . |
| WO 98/05538 | | 2/1998 | (WO) . |
| 9929531 | * | 6/1999 | (WO) . |
| 0007859 | * | 2/2000 | (WO) . |

* cited by examiner

Primary Examiner—Douglas C. Butler
(74) Attorney, Agent, or Firm—Evenson, McKeown, Edwards & Lenahan, P.L.L.C.

(57) ABSTRACT

An automatic braking operation is triggered before the operation of the brake pedal if, as the required criterion, the operating speed exceeds a triggering threshold value when the gas pedal is released. The triggering threshold value is adapted to the driver's actions to achieve a more reliable separation between necessary and unnecessary triggerings of the automatic braking operation. At least one magnitude is detected which represents the driver's actions and, on the basis of this magnitude, the triggering threshold value for the automatic braking operation is determined. It is thus unimportant whether the required criterion for the triggering of the automatic braking operation is sufficient or whether additional criteria are required for this purpose, such as the determination of a transfer of the driver's foot from the gas pedal to the brake pedal.

71 Claims, 4 Drawing Sheets

METHOD FOR DETERMINING A TRIGGERING THRESHOLD VALUE FOR AN AUTOMATIC BRAKING OPERATION

BACKGROUND AND SUMMARY OF THE INVENTION

This application claims the priority of German Application No. 197 45 128.4, filed Oct. 13, 1997, the disclosure of which is expressly incorporated by reference herein.

The invention relates to a method for determining the triggering threshold value for an automatic braking operation.

A method of the above-mentioned type for triggering an automatic braking operation is known from German Patent document DE 44 22 664 A1. In the case of this method, an automatic braking operation is triggered before the brake pedal is operated if, as a necessary criterion, the operating speed (vg) during the release of the gas pedal exceeds a triggering threshold value. According to German Patent document DE 44 22 664 A1, on which this application is based, this required criterion is not sufficient; that is, for the actual triggering of the automatic braking operation, it is required that additional criteria be met.

In this case, it is difficult to determine a specific magnitude of the triggering threshold value at which the automatic braking operation is triggered. If the braking operation is triggered too frequently, the driving comfort can be significantly impaired. On the other hand, if the triggering does not take place as required, the braking distance is extended unnecessarily in comparison to a case in which an automatic braking operation is triggered.

There is therefore needed a method which adapts the triggering threshold value to the driver's actions to thus achieve a more reliable separation between required and not required triggerings of the automatic braking operation.

These needs are met by a method for determining a triggering threshold value for an automatic braking operation, in which the automatic braking operation is triggered before the brake pedal is operated by the driver, and a required condition for triggering the braking operating is that, when the gas pedal is released, the operating speed exceeds a triggering threshold value. The triggering threshold value is determined as a function of detected magnitudes which represent the driver's actions in the driving operation.

According to the invention, at least one value is detected which represents the driver's vehicle handling and, based on this value, the triggering threshold for the automatic braking operation is determined. In this case, it is unimportant whether the necessary criterion for triggering the automatic braking operation is sufficient or whether additional criteria are required for this purpose, such as the determination of the transfer of the driver's foot from the gas pedal to the brake pedal.

According to the advantageous further embodiments of the present invention, the operating speed of the clutch pedal or of the gear change shifting lever is used as the value representing the driver's actions. In addition to or independently thereof, the operating speed of the gas pedal or of the brake pedal can also be detected and correspondingly analyzed. According to a further advantageous embodiment, in the case of vehicles with automatic transmissions, the frequency of the kick-down operations of the gas pedal is analyzed. According to the further embodiments, the acceleration or the deceleration of the vehicle itself is used for detecting the driver's actions and for correspondingly adapting the triggering threshold value.

In general, it should be stressed that, as the value of the detected magnitudes rises, a higher value of the triggering threshold is established. In this case, the above-mentioned magnitudes can be used individually or in combinations for determining the triggering threshold value. This takes place, for example, by means of a multi-dimensional characteristic diagram.

The drawing illustrates examples of the different characteristic curves of the individual magnitudes. The combination of the individual characteristic curves can be carried out by a simple mutual linking as well as by adapted multi-dimensional characteristic diagrams.

Other objects, advantages and novel features of the present invention will become apparent from the following detailed description of the invention when considered in conjunction with the accompanying drawings.

DETAILED DESCRIPTION OF THE DRAWINGS

Figure 1:
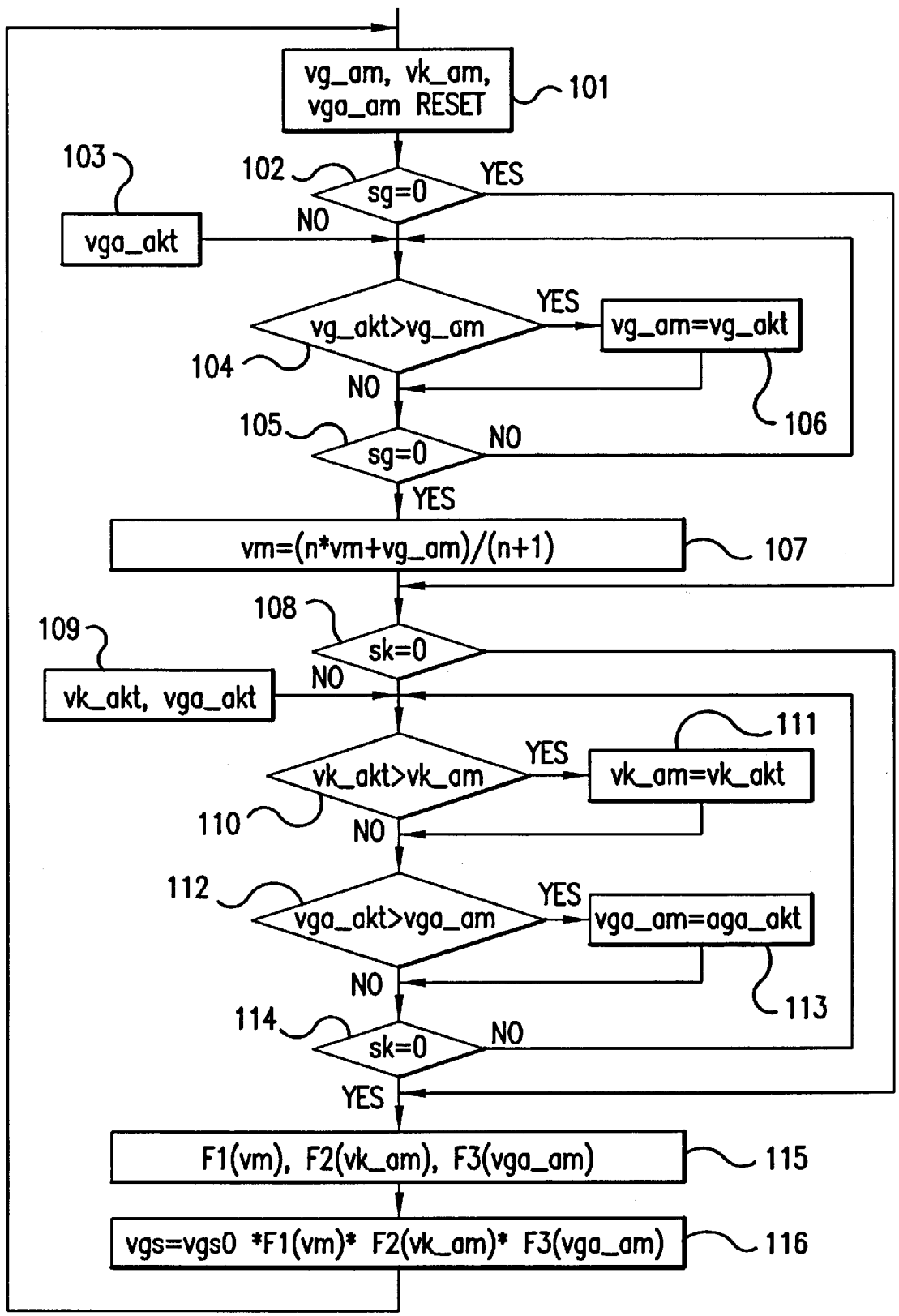
FIG. 1 is a flow chart of a method according to the invention for determining the triggering threshold value of an automatic braking operation.

FIG. 1 is the flow chart of a method according to the invention in which the value of the triggering threshold vgs is determined as a function of three quantities, specifically, the operating speed vg of the gas pedal, the operating speed vk of the clutch pedal and the operating speed vga of the gear change shift lever.

According to step 101, the values vg_am, vk_am and vga_am, which are used as the intermediate memories for detecting the maximum of the actual operation, are reset. Then it is checked in step 102 whether the gas pedal is in its inoperative position sg=0. If this is so, a jump takes place to step 108. Otherwise, according to step 103, the actual value of the operating speed vg_akt is detected. In step 104, it is checked whether this value is higher than the value vg_am in the intermediate memory. If this is so, in step 106, the actual value vg_akt is filed in the intermediate memory vg_am and a jump takes place to step 105. Otherwise, a jump also takes place to step 105. If, in the case of the values vg_akt, only the amount (without the preceding signs) is detected, all operations of the gas pedal are detected in this case. If only operations of the gas pedal are to be taken into account which correspond to a vehicle acceleration, only positive values of the operating speeds should be taken into account, while, in a case in which only operations are to be taken into account which correspond to a release of the gas pedal, only negative values of the operating speeds should be taken into account, in which case the amount of these negative values must be used.

In step 105, it is checked whether the gas pedal has reached its inoperative position sg=0. If this is not so, a jump takes place back to step 103.

Otherwise, a determination takes place in step 107 according to a sliding averaging from the preceding operating speed average vm and the determined intermediate memory value vg_am (with an n-fold weighting of the preceding operating speed average) according to the equation $$vm=(n*vm+vg\_am)/(n+1)$$

and then step 108 is carried out. The process according to steps 102 to 107 takes place analogous for determining the corresponding operating speed average vbm of the brake pedal. Likewise, this method can be used analogously for taking into account the acceleration and the deceleration of the vehicle.

In step 108, it is checked whether the clutch pedal is in its inoperative position sk=0. If this is so, a jump takes place to step 115. Otherwise, according to step 109, actual values vk_akt and vga_akt of the operating speed of the clutch pedal and of the gear change shift pedal are detected. Then it is checked in step 110 whether the actual value vk_akt of the operating speed of the clutch pedal is higher than the value vk_am filed in the intermediate memory. If this is so, according to step 111, the actual value vk_akt is filed in the intermediate memory and then step 112 is carried out. Otherwise, a jump takes place directly to step 112.

According to step 112, it is now checked whether the actual value vga_akt of the operating speed of the gear change shift lever is higher than the value vga_am filed in the intermediate memory. If this is so, according to step 113, the actual value vga_akt is filed in the intermediate memory and then step 114 is carried out. Otherwise, a jump takes place directly to step 114.

In step 114, it is checked whether the gas pedal has reached its inoperative position sk=0. If this is not so, a jump takes place back to step 109.

On the basis of the last determined values of the operating speeds vm, vk_am and vga_am, the factors (functions) F1, F2 and F3, which are in each case assigned to them, are determined in step 115. This may, for example, be determined by means of one of the characteristic curves described in the following.

In step 116, the triggering threshold value vgs is determined for the triggering of the automatic braking operation. For this purpose, a predetermined value vgs0 (normal setting), which corresponds to an average value adapted to the vehicle, is multiplied by the factors F1, F2 and F3. Then a jump takes place back to step 101.

FIGS. 2a to 2e show different characteristic curves for the different magnitudes to be used for determining the triggering threshold value vgs, in which case one factor (F1 to F6) respectively is listed in the ordinate, by which a predetermined value vgs0 is multiplied. In this case, all or only some of the factors can be used. Whether a certain factor is used, may depend, for example, on when it was last updated. If its updating took place too long ago, a factor, which is otherwise taken into account, may be ignored. The numerical values indicated as examples in FIGS. 2a to 2e, which are listed in the figures, and the courses of the characteristic curves, may be considered as a possible suggestion with respect to coordinating the actual courses of the curves and the numerical values as a function of the constructive situation of the vehicle and its handling.

Figure 2A:
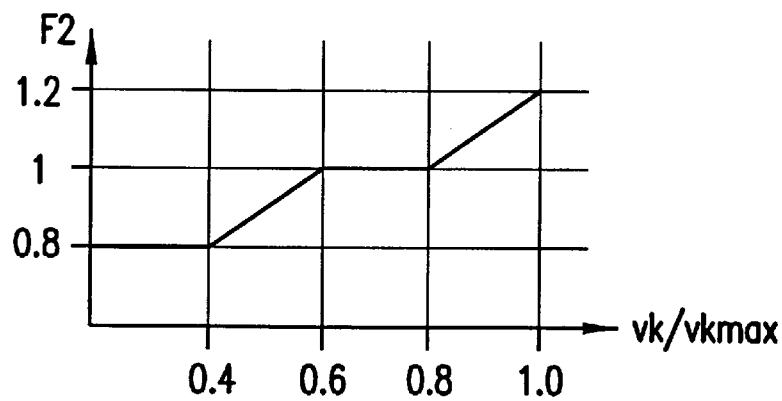
FIGS. 2a, 2b, 2c, 2d and 2e are views of various characteristic curves for changing the triggering threshold value as a function of different detected magnitudes which represent the driver's actions in the driving operation.

FIG. 2a illustrates the characteristic curve of an above-determined factor F2 which was determined as a function of the operating speed vk of the clutch pedal, in which case the operating speed vk was listed in the abscissa relative to the maximal operating speed. The factor F2 is listed in the ordinate. The characteristic curve extends in steps, the steps are connected by way of areas of a linear rise.

Figure 2B:
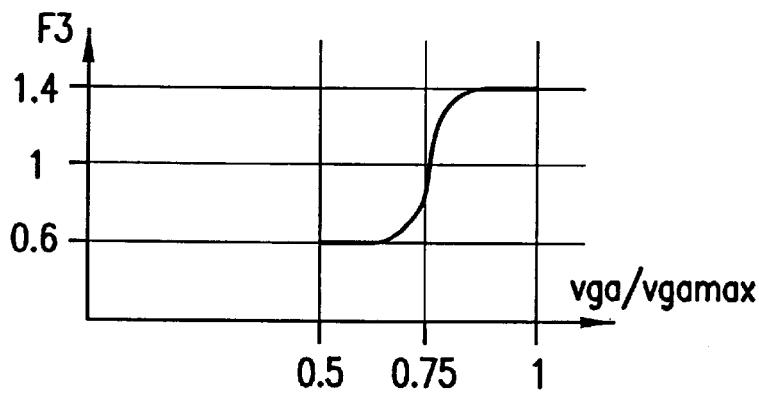

FIG. 2b illustrates the assignment of the factor F3 to the operating speed vga of the gear change shift lever. It is also listed in the abscissa relative to a maximal operating speed vgamax of the gear change shift lever. In this case, the fast rise of the factor F3 by the value 0.75 of the operating speed is characteristic, which corresponds to a division into essentially two classes of drivers.

Figure 2C:
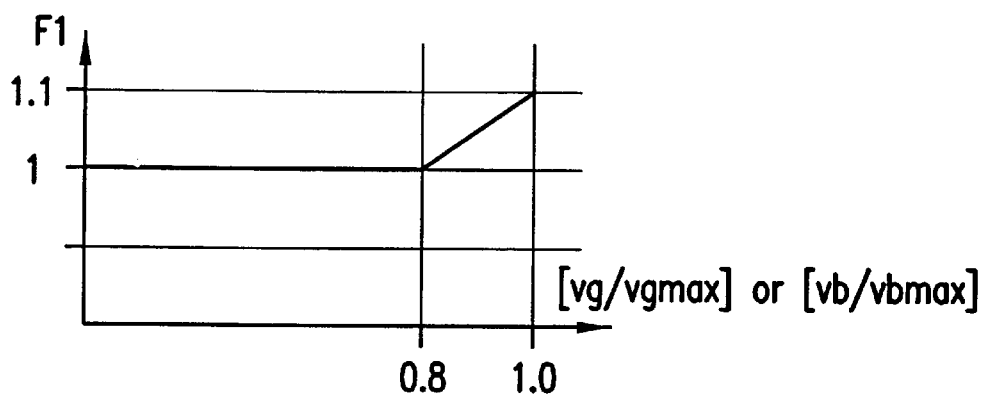

FIG. 2c shows the corresponding curve for the factor F1 of the flow chart of FIG. 1. In this case, the amount of the operating speed vg of the gas pedal relative to its maximal operating speed is listed in the abscissa. This corresponds to taking into account operations of the gas pedal, which correspond to an acceleration of the vehicle as well as to the releasing of the gas pedal. This characteristic curve may also be used for the corresponding operating speeds vb of the brake pedal.

Figure 2D:
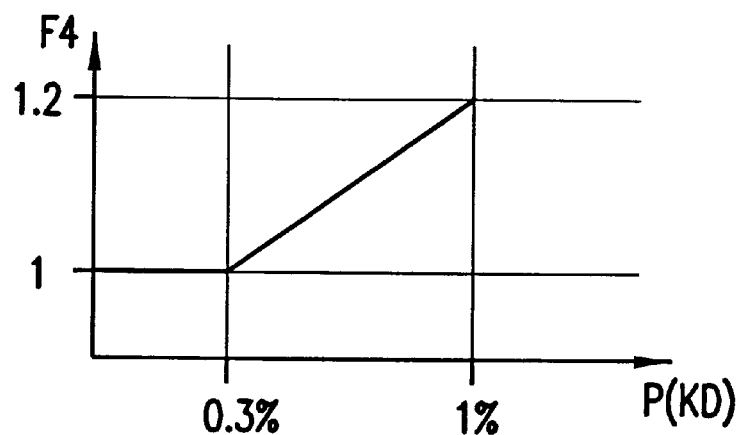

FIG. 2d shows the characteristic curve of a factor F4 which has an area of a linear rise. The probability P(KD) of a kick-down operation of the gas pedal relative to all gas pedal operations is listed in the ordinate.

Figure 2E:
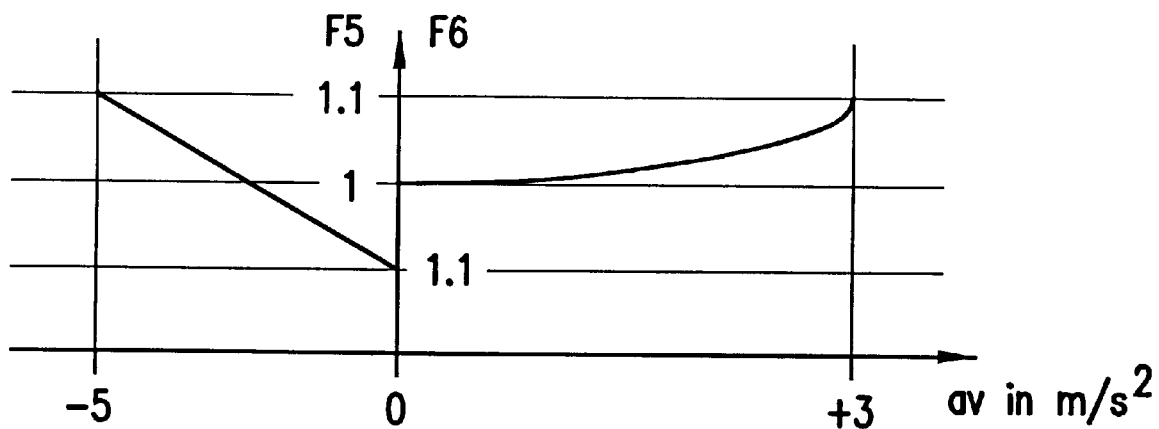

FIG. 2e shows the characteristic curves of the factors F5 and F6 which are listed as a function of the achieved decelerations or accelerations of the vehicle, in which case negative abscissa values are assigned to a deceleration and positive abscissa values are assigned to an acceleration of the vehicle. If the driver reaches only low decelerations during the braking, the triggering threshold value vgs is tendentiously reduced. At high decelerations, the triggering threshold value vgs is raised and is therefore assigned to values higher than 1 of factor F5. The situation is different in the case of accelerations. In this case, no reductions of the triggering threshold value take place at low accelerations.

Figure 3:
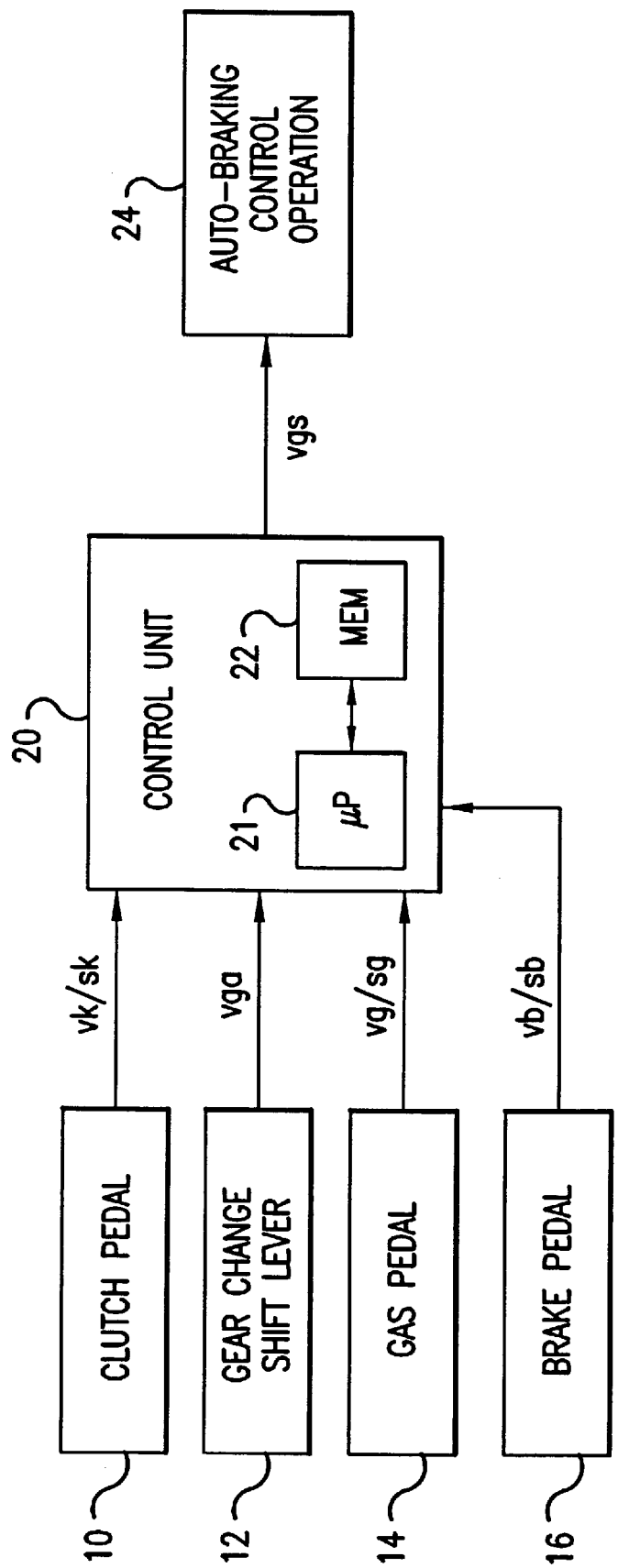
FIG. 3 is a block diagram of an apparatus for performing the method according to the present invention.

FIG. 3 is a general block diagram illustrating an apparatus for performing the method of determining a triggering threshold value for an automatic braking operation. An electronic control unit 20 includes a computer such as a microprocessor 21 coupled with a memory 22. Of course, it will be understood that other types of control units can be used such as a specific hard-wired circuit or some combination of an appropriately programmed processor in combination with specific circuitry. The control unit 20 receives as its inputs the operating speeds vk, vga, vg and vb from the clutch pedal, gear change shift lever, gas pedal and brake pedal 10, 12, 14 and 16, respectively. In accordance with the preferred embodiment, these inputs are processed in accordance with the program described above in the flow chart of FIG. 1. The control unit therefore outputs a triggering threshold vgs to perform the automatic braking operation 24. The characteristic curves described above with respect to the FIGS. 2a–2e can be stored in the control unit 20, for example, in the memory 22.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an automatic braking operation, the method comprising the acts of:

detecting at least one magnitude representing a driver's behavior over time under different driving situations;

adapting a triggering threshold value as a function of the at least one detected magnitude representative of the driver's behavior over time under different driving situations;

determining for a particular driving situation whether, when a gas pedal is released, a release operating speed (vg) of the gas pedal exceeds the previously adapted triggering threshold value (vgs); and requiring as a minimum condition for triggering the automatic braking operation before the brake pedal is operated by the driver that the release operating speed of the gas pedal exceed the previously adapted triggering threshold value.

2. The method according to claim 1, further comprising the acts of:
  detecting an operating speed (vk) of a clutch pedal; and
  determining the triggering threshold as a function of the clutch pedal operating speed (vk).

3. The method according to claim 1, further comprising the act of:
  detecting an operating speed (vga) of a gear change shift lever; and
  determining the triggering threshold value as a function of the gear change shift lever operating speed (vga).

4. The method according to claim 2, further comprising the act of:
  detecting an operating speed (vga) of a gear change shift lever; and
    determining the triggering threshold value as a function of the gear change shift lever operating speed (vga).

5. The method according to claim 2, further comprising the act of raising the triggering threshold value to a higher level as an amount of the clutch pedal operating speed rises.

6. The method according to claim 3, further comprising the act of raising the triggering threshold value to a higher level as an amount of the gear change shift lever operating speed (vga) rises.

7. The method according to claim 4, further comprising the act of raising the triggering threshold value to a higher level as an amount of at least one of the clutch pedal operating speed and gear change shift lever operating speed rises.

8. The method according to claim 1, further comprising the act of detecting an operating speed (vg) of the gas pedal; and
  determining the triggering threshold value (vgs) as a function of the gas pedal operating speed (vg).

9. The method according to claim 2, further comprising the act of detecting an operating speed (vg) of the gas pedal; and
  determining the triggering threshold value (vgs) as a function of the gas pedal operating speed (vg).

10. The method according to claim 3, further comprising the act of detecting an operating speed (vg) of the gas pedal; and
  determining the triggering threshold value (vgs) as a function of the gas pedal operating speed (vg).

11. The method according to claim 4, further comprising the act of detecting an operating speed (vg) of the gas pedal; and
  determining the triggering threshold value (vgs) as a function of the gas pedal operating speed (vg).

12. The method according to claim 7, further comprising the act of detecting an operating speed (vg) of the gas pedal; and
  determining the triggering threshold value (vgs) as a function of the gas pedal operating speed (vg).

13. The method according to claim 8, further comprising the act of using the gas pedal operating speed during an acceleration of the vehicle preceding the release of the gas pedal for determining the triggering threshold value.

14. The method according to claim 9, further comprising the act of using the gas pedal operating speed during an acceleration of the vehicle preceding the release of the gas pedal for determining the triggering threshold value.

15. The method according to claim 10, further comprising the act of using the gas pedal operating speed during an acceleration of the vehicle preceding the release of the gas pedal for determining the triggering threshold value.

16. The method according to claim 11, further comprising the act of using the gas pedal operating speed during an acceleration of the vehicle preceding the release of the gas pedal for determining the triggering threshold value.

17. The method according to claim 12, further comprising the act of using the gas pedal operating speed during an acceleration of the vehicle preceding the release of the gas pedal for determining the triggering threshold value.

18. The method according to claim 8, further comprising the acts of forming an operating speed average value (vm) from the operating speeds preceding the release of the gas pedal; and determining the triggering threshold value as a function of the operating speed average value.

19. The method according to claim 9, further comprising the acts of forming an operating speed average value (vm) from the operating speeds preceding the release of the gas pedal; and
  determining the triggering threshold value as a function of the operating speed average value.

20. The method according to claim 10, further comprising the acts of forming an operating speed average value (vm) from the operating speeds preceding the release of the gas pedal; and
  determining the triggering threshold value as a function of the operating speed average value.

21. The method according to claim 11, further comprising the acts of forming an operating speed average value (vm) from the operating speeds preceding the release of the gas pedal; and
  determining the triggering threshold value as a function of the operating speed average value.

22. The method according to claim 12, further comprising the acts of forming an operating speed average value (vm) from the operating speeds preceding the release of the gas pedal; and
  determining the triggering threshold value as a function of the operating speed average value.

23. The method according to claim 18, wherein the act of forming an operating speed average value uses only gas pedal operations corresponding to an acceleration of the vehicle.

24. The method according to claim 22, wherein the act of forming an operating speed average value uses only gas pedal operations corresponding to an acceleration of the vehicle.

25. The method according to claim 18, wherein the act of forming the operating speed average value uses all operations of the gas pedal.

26. The method according to claim 22, wherein the act of forming the operating speed average value uses all operations of the gas pedal.

27. The method according to claim 18, wherein the act of forming the operating speed average value uses only gas pedal operations which correspond to the release of the gas pedal.

28. The method according to claim 22, wherein the act of forming the operating speed average value uses only gas pedal operations which correspond to the release of the gas pedal.

29. The method according to claim 8, wherein the triggering value (vgs) rises with increasing operating speeds.

30. The method according to claim 13, wherein the triggering value (vgs) rises with increasing operating speeds.

31. The method according to claim 18, wherein the triggering value (vgs) rises with increasing operating speeds.

32. The method according to claim 23, wherein the triggering value (vgs) rises with increasing operating speeds.

33. The method according to claim 25, wherein the triggering value (vgs) rises with increasing operating speeds.

34. The method according to claim 27, wherein the triggering value (vgs) rises with increasing operating speeds.

35. The method according to claim 1, wherein for vehicles having automatic transmissions, the method detects a frequency of kick-down operations of the gas pedal and raises the triggering threshold value with an increasing frequency of kick-down operations.

36. The method according to claim 2, wherein for vehicles having automatic transmissions, the method detects a frequency of kick-down operations of the gas pedal and raises the triggering threshold value with an increasing frequency of kick-down operations.

37. The method according to claim 3, wherein for vehicles having automatic transmissions, the method detects a frequency of kick-down operations of the gas pedal and raises the triggering threshold value with an increasing frequency of kick-down operations.

38. The method according to claim 5, wherein for vehicles having automatic transmissions, the method detects a frequency of kick-down operations of the gas pedal and raises the triggering threshold value with an increasing frequency of kick-down operations.

39. The method according to claim 8, wherein for vehicles having automatic transmissions, the method detects a frequency of kick-down operations of the gas pedal and raises the triggering threshold value with an increasing frequency of kick-down operations.

40. The method according to claim 1, further comprising the act of detecting an operating speed (vb) of the brake pedal; and determining the triggering threshold value as a function of the brake pedal operating speed (vb).

41. The method according to claim 2, further comprising the act of detecting an operating speed (vb) of the brake pedal; and determining the triggering threshold value as a function of the brake pedal operating speed (vb).

42. The method according to claim 3, further comprising the act of detecting an operating speed (vb) of the brake pedal; and determining the triggering threshold value as a function of the brake pedal operating speed (vb).

43. The method according to claim 5, further comprising the act of detecting an operating speed (vb) of the brake pedal; and determining the triggering threshold value as a function of the brake pedal operating speed (vb).

44. The method according to claim 8, further comprising the act of detecting an operating speed (vb) of the brake pedal; and determining the triggering threshold value as a function of the brake pedal operating speed (vb).

45. The method according to claim 35, further comprising the act of detecting an operating speed (vb) of the brake pedal; and determining the triggering threshold value as a function of the brake pedal operating speed (vb).

46. The method according to claim 40, wherein the act of determining the triggering threshold value (vgs) uses the brake pedal operating speed during the acceleration of the vehicle preceding the release of the brake pedal.

47. The method according to claim 40, further comprising the act of forming an operating speed average value (vbm) from the brake pedal operating speeds preceding the release of the brake pedal; and determining the triggering threshold value as a function of the brake pedal operating speed average value (vbm).

48. The method according to claim 47, wherein the act of forming the brake pedal operating speed average value (vbm) uses only brake pedal operations which correspond to an increased brake pressure.

49. The method according to claim 47, wherein the act of forming the brake pedal operating speed average (vbm) uses all brake pedal operations of the brake pedal.

50. The method according to claim 47, wherein the act of forming the brake pedal operating speed average value uses only brake pedal operations corresponding to a reduced brake pressure.

51. The method according to claim 40, wherein the triggering threshold value rises with increasing brake pedal operating speeds.

52. The method according to claim 46, wherein the triggering threshold value rises with increasing brake pedal operating speeds.

53. The method according to claim 47, wherein the triggering threshold value rises with increasing brake pedal operating speeds.

54. The method according to claim 48, wherein the triggering threshold value rises with increasing brake pedal operating speeds.

55. The method according to claim 49, wherein the triggering threshold value rises with increasing brake pedal operating speeds.

56. The method according to claim 50, wherein the triggering threshold value rises with increasing brake pedal operating speeds.

57. The method according to claim 1, further comprising the act of detecting acceleration values (av) of the vehicle; and raising the triggering threshold value (vgs) as an amount of the acceleration values increases.

58. The method according to claim 2, further comprising the act of detecting acceleration values (av) of the vehicle; and raising the triggering threshold value (vgs) as an amount of the acceleration values increases.

59. The method according to claim 3, further comprising the act of detecting acceleration values (av) of the vehicle; and raising the triggering threshold value (vgs) as an amount of the acceleration values increases.

60. The method according to claim 5, further comprising the act of detecting acceleration values (av) of the vehicle; and raising the triggering threshold value (vgs) as an amount of the acceleration values increases.

61. The method according to claim 8, further comprising the act of detecting acceleration values (av) of the vehicle; and raising the triggering threshold value (vgs) as an amount of the acceleration values increases.

62. The method according to claim 35, further comprising the act of detecting acceleration values (av) of the vehicle; and raising the triggering threshold value (vgs) as an amount of the acceleration values increases.

63. The method according to claim 40, further comprising the act of detecting acceleration values (av) of the vehicle; and raising the triggering threshold value (vgs) as an amount of the acceleration values increases.

64. The method according to claim 1, further comprising the act of detecting deceleration values of the vehicle; and raising the triggering threshold value as an amount of the deceleration values increase.

65. The method according to claim 2, further comprising the act of detecting deceleration values of the vehicle; and raising the triggering threshold value as an amount of the deceleration values increase.

66. The method according to claim 3, further comprising the act of detecting deceleration values of the vehicle; and raising the triggering threshold value as an amount of the deceleration values increase.

67. The method according to claim 5, further comprising the act of detecting deceleration values of the vehicle; and raising the triggering threshold value as an amount of the deceleration values increase.

68. The method according to claim 8, further comprising the act of detecting deceleration values of the vehicle; and raising the triggering threshold value as an amount of the deceleration values increase.

69. The method according to claim 35, further comprising the act of detecting deceleration values of the vehicle; and raising the triggering threshold value as an amount of the deceleration values increase.

70. The method according to claim 40, further comprising the act of detecting deceleration values of the vehicle; and raising the triggering threshold value as an amount of the deceleration values increase.

71. The method according to claim 57, further comprising the act of detecting deceleration values of the vehicle; and raising the triggering threshold value as an amount of the deceleration values increase.

* * * * *